United States Patent
Yoon et al.

(10) Patent No.: US 10,642,392 B2
(45) Date of Patent: May 5, 2020

(54) TOUCH SENSOR AND METHOD OF MANUFACTURING THE SAME

(71) Applicant: DONGWOO FINE-CHEM CO., LTD., Jeollabuk-do (KR)

(72) Inventors: Ju In Yoon, Gyeonggi-do (KR); Jae Hyun Lee, Gyeonggi-do (KR); Yong-Seok Choi, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 74 days.

(21) Appl. No.: 15/896,393

(22) Filed: Feb. 14, 2018

(65) Prior Publication Data

US 2018/0232090 A1  Aug. 16, 2018

(30) Foreign Application Priority Data

Feb. 16, 2017 (KR) .......................... 10-2017-0020933

(51) Int. Cl.
*G06F 3/044* (2006.01)
*G06F 3/041* (2006.01)
*G06F 3/042* (2006.01)

(52) U.S. Cl.
CPC ............ *G06F 3/0412* (2013.01); *G06F 3/041* (2013.01); *G06F 3/042* (2013.01); *G06F 2203/04103* (2013.01)

(58) Field of Classification Search
CPC .......................... H03K 17/955; H03K 17/962; G02F 1/13338; G06F 2200/1634; G06F 2200/0339; G06F 2200/04103; G06F 2200/04104; G06F 3/03547; G06F 3/041–0416; G06F 3/0488–04886;
(Continued)

(56) References Cited

U.S. PATENT DOCUMENTS

2012/0287079 A1* 11/2012 Sato ................. G06F 3/044 345/174
2014/0299365 A1* 10/2014 Sebastian ........... G06F 3/044 174/255

(Continued)

FOREIGN PATENT DOCUMENTS

JP  2014-035754 A  2/2014
JP  2016-224631 A  12/2016
(Continued)

OTHER PUBLICATIONS

Office action dated Jan. 7, 2019 from Korean Patent Office in a counterpart Korean Patent Application No. 10-2017-0020933 (all the cited references are listed in this IDS.) (English translation is submitted herewith.).

(Continued)

*Primary Examiner* — Sanghyuk Park
(74) *Attorney, Agent, or Firm* — The PL Law Group, PLLC

(57) ABSTRACT

A touch sensor includes a base film including a first region and a second region. First sensing electrode patterns are formed on the first region of the base film. The first sensing electrode pattern may consist of a transparent metal oxide. Second sensing electrode patterns are formed on the second region of the base film. The second sensing electrode pattern may include a multi-layered structure that includes a transparent metal oxide pattern and a metal pattern.

20 Claims, 16 Drawing Sheets

(58) Field of Classification Search
CPC . G06F 2203/04107; G06F 2203/04111; G06F 2203/04112; G06F 1/169–1692; G06F 1/1643
See application file for complete search history.

(56) References Cited

U.S. PATENT DOCUMENTS

| | | | | |
|---|---|---|---|---|
| 2015/0070309 A1* | 3/2015 | Kang | ................ | G06F 3/044 345/174 |
| 2016/0299608 A1* | 10/2016 | Choi | ................ | G06F 3/0416 |
| 2016/0320872 A1* | 11/2016 | Lee | ................ | G06F 3/044 |
| 2018/0203531 A1* | 7/2018 | Tsai | ................ | G06F 3/044 |

FOREIGN PATENT DOCUMENTS

| | | |
|---|---|---|
| KR | 10-2011-0093069 A | 8/2011 |
| KR | 10-2011-0093549 A | 8/2011 |
| KR | 10-2011-0095669 A | 8/2011 |
| KR | 10-2012-0043239 A | 5/2012 |
| KR | 10-2014-0092366 A | 7/2014 |
| KR | 10-2015-0093328 A | 8/2015 |

OTHER PUBLICATIONS

Office action dated Jun. 7, 2019 from Korean Patent Office in a counterpart Korean Patent Application No. 10-2017-0020933 (all the cited references are listed in this IDS.) (English translation is submitted herewith.).

* cited by examiner

TOUCH SENSOR AND METHOD OF MANUFACTURING THE SAME

CROSS-REFERENCE TO RELATED APPLICATION AND CLAIM OF PRIORITY

This application claims priority to Korean Patent Applications No. 10-2017-0020933 filed on Feb. 16, 2017 in the Korean Intellectual Property Office (KIPO), the entire disclosure of which is incorporated by reference herein.

BACKGROUND

1. Field

The present invention relates to a touch sensor and a method of manufacturing the same. More particularly, the present invention relates to a touch sensor including multi-layered electrode patterns and a method of manufacturing the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel capable of inputting a user's direction by selecting an instruction displayed in a screen is also developed. The touch panel may be combined with the display device so that display and information input functions may be implemented in one electronic device.

Further, the display device has become thinner, and a flexible display device having a bending or folding property is being developed. Thus, the touch panel having the flexible property is also required to be employed to the flexible display device.

If the touch panel is inserted in the display device, an image quality may be degraded when electrode patterns of the touch panel are viewed by the user. Thus, the touch panel having a thin thickness and flexibility and also having improved optical property is needed. Additionally, a high sensitivity of the electrode patterns is also needed while obtaining the optical property.

For example, a touch screen panel including a touch sensor is employed in various image display devices as disclosed in Korean Patent Publication No. 2014-0092366. However, demands for a thin-layered touch sensor or touch panel having improved optical property and sensitivity are continuously increasing.

SUMMARY

According to an aspect of the present invention, there is provided a touch sensor having improved optical and electrical properties.

According to an aspect of the present invention, there is provided a method of manufacturing a touch sensor having improved optical and electrical properties.

According to an aspect of the present invention, there is provided an image display device which includes a touch sensor having improved optical and electrical properties.

The above aspects of the present inventive concepts will be achieved by the following features or constructions:

(1) A touch sensor, comprising: a base film including a first region and a second region; first sensing electrode patterns on the first region of the base film, the first sensing electrode pattern consisting of a transparent metal oxide; and second sensing electrode patterns on the second region of the base film, the second sensing electrode pattern including a multi-layered structure that includes a transparent metal oxide pattern and a metal pattern.

(2) The touch sensor according to the above (1), wherein the first sensing electrode pattern has a sheet resistance and a light transmittance greater than those of the second sensing electrode pattern.

(3) The touch sensor according to the above (1), wherein the second sensing electrode pattern includes a first transparent metal oxide pattern, the metal pattern and a second transparent metal oxide pattern which are sequentially stacked.

(4) The touch sensor according to the above (3), wherein the first transparent metal oxide pattern includes indium tin oxide (ITO), and the second transparent metal oxide pattern may include indium zinc oxide (IZO).

(5) The touch sensor according to the above (1), wherein the first sensing electrode pattern has a single-layered structure of indium tin oxide (ITO).

(6) The touch sensor according to the above (1), further comprising bridge patterns electrically connecting neighboring ones of the first sensing electrode patterns each other, and electrically connecting neighboring ones of the sensing electrode patterns each other.

(7) The touch sensor according to the above (6), wherein the bridge pattern includes a metal, and the bridge patterns are disposed under the first sensing electrode patterns and the second sensing electrode patterns on the base film.

(8) The touch sensor according to the above (7), wherein the base film further includes a third region, and the touch sensor further comprises a pad on the third region of the base film.

(9) The touch sensor according to the above (8), wherein the pad includes a stack structure including a first conductive pattern and a second conductive pattern, wherein the first conductive pattern includes a metal and the second conductive pattern includes a transparent metal oxide.

(10) The touch sensor according to the above (9), wherein the first conductive pattern includes a material the same as the metal of the bridge pattern, and the second conductive pattern includes a material the same as the transparent metal oxide of the first sensing electrode pattern.

(11) The touch sensor according to the above (8), further comprising a passivation layer formed on the first region and the second region to cover the first sensing electrode pattern and the second sensing electrode pattern.

(12) The touch sensor according to the above (11), wherein the passivation layer partially covers a portion of the base film on the third region such that the pad is exposed.

(13) A method of manufacturing a touch sensor, comprising: preparing a base film including a first region and a second region; forming a first transparent metal oxide layer on the base film; forming a low resistance pattern on a portion of the first transparent metal oxide layer on the second region, the low resistance pattern having a resistance less than that of the first transparent metal oxide layer; etching the first transparent metal oxide layer using the low resistance pattern as a mask to form a second sensing electrode pattern including the low resistance pattern on the second region; and forming a first sensing electrode pattern consisting of a transparent metal oxide on a portion of the base film of the first region.

(14) The method according to the above (13), wherein preparing the base film includes forming a separation layer on a carrier substrate; and forming a protective layer on the separation layer.

(15) The method according to the above (14), further comprising forming a passivation layer covering the first sensing electrode pattern and the second sensing electrode pattern; and detaching the carrier substrate from the separation layer.

(16) The method according to the above (13), wherein the base film further includes a third region, wherein the method further comprises forming a pad on a portion of the base film of the third region.

(17) The method according to the above (16), further comprising forming a second transparent metal oxide layer after forming the second sensing electrode pattern, wherein the first sensing electrode pattern and the pad are formed simultaneously by etching the second transparent metal oxide layer.

(18) The method according to the above (16), wherein the first sensing electrode pattern and the pad are formed simultaneously by etching the first transparent metal oxide layer.

(19) The method according to the above (13), further comprising before forming the first transparent metal oxide layer: forming bridge patterns on the base film by etching a metal layer; and forming an insulation layer that includes contact holes partially exposing the bridge patterns, wherein the first transparent metal oxide layer is formed on the insulation layer to at least partially fill the contact holes.

(20) An image display device, comprising: a window film including a plane portion and a bent portion; and a touch sensor according to any one of the above (1) to (12) disposed under the window film, wherein a portion of the touch sensor of the first region is located in the plane portion and a portion of the touch sensor of the second region is located in the bent portion.

According to exemplary embodiments of the present invention, the touch sensor may include electrode patterns of different stacked construction formed at each of a high transmittance region and a high sensitivity region so that both optical and electrical properties of the touch sensor may be improved.

In exemplary embodiments, the electrode pattern may be formed as a single layer of a transparent metal oxide in the high transmittance region, and the electrode pattern may be formed as a multi-layer of a transparent metal oxide layer and a metal layer in the high sensitivity region. Thus, a transmittance may be improved, and the electrode pattern may be prevented from being seen in the high transmittance region and a channel resistance may be reduced to improve a signal transfer speed in the high sensitivity region.

In some embodiments, the high transmittance region may be located in a front face of an image display device, and the high sensitivity region may be located in a lateral portion or a bent portion of the image display device. Thus, an information transfer with high sensitivity may be implemented without degrading an image quality.

DETAILED DESCRIPTION

According to exemplary embodiments of the present invention, a touch sensor and a method of manufacturing the touch sensor are provided. The touch sensor may include a base film including a first region and a second region, first sensing electrode patterns disposed on the first region and consisting of a transparent metal oxide, and second sensing electrode patterns disposed on the second region and including a multi-layered structure of a transparent metal oxide pattern and a metal pattern. Thus, both high sensitivity and high transmittance of the touch sensor may be realized. Further, an image display device including the touch sensor is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
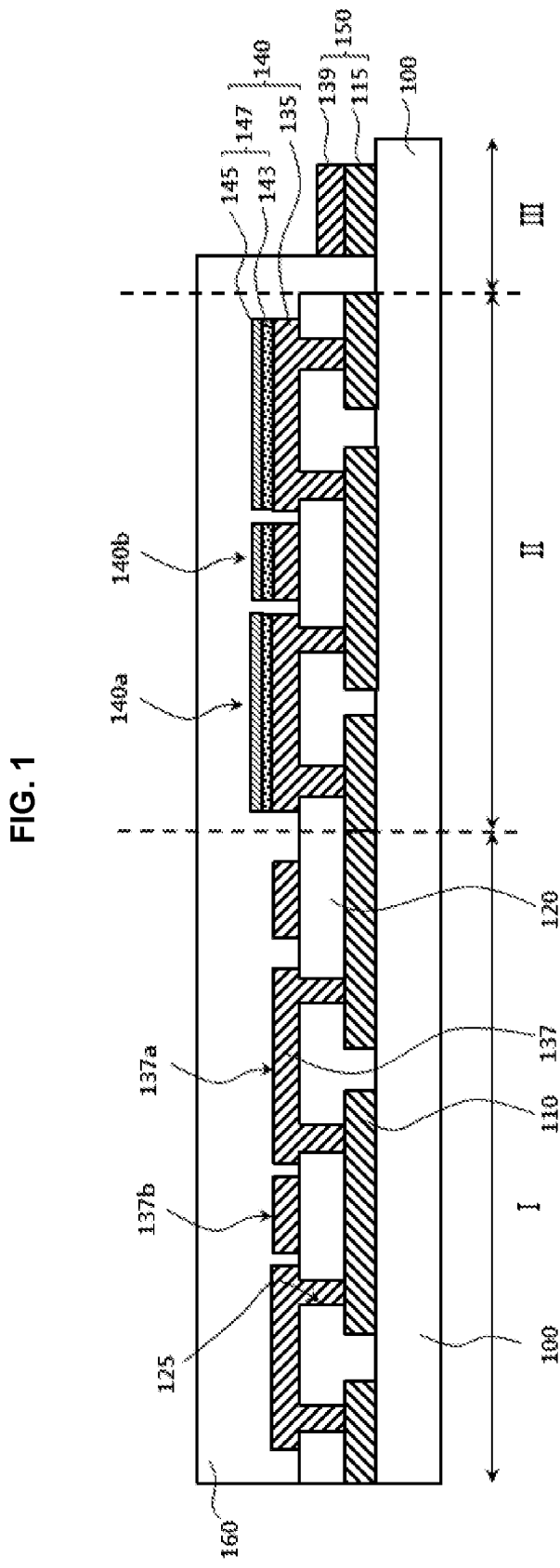
FIG. 1 is a cross-sectional view illustrating a touch sensor in accordance with exemplary embodiments.

FIG. 1 is a cross-sectional view illustrating a touch sensor in accordance with exemplary embodiments. Referring to FIG. 1, the touch sensor may include a first region I, a second region II and a third region III. In exemplary embodiments, a base film 100 may be also divided into the first region I, the second region II and the third region III. A first sensing electrode pattern 137, a second sensing electrode pattern 140 and a pad 150 may be disposed on the first region I, the second region II and the third region III of the base film 100, respectively.

For convenience of descriptions, FIG. 1 illustrates that the third region III is adjacent to a right portion of the second region II. However, a location of the third region III is not specifically limited. For example, the third region III may be adjacent to the first region I and the second region II. A plurality of the pads 150 may be disposed on the third region III. A driving signal to the first and second sensing electrode patterns 137 and 140 on the first and second regions I and II may be received and transferred commonly through the pads 150.

In exemplary embodiments, the first region I may have a transmittance greater than that of the second region II. The second region II may have a lower resistance and/or a higher touch sensitivity than those of the first region I. The third region III may correspond to a pad region, a trace region or a wiring region of the touch sensor. For example, a flexible printed circuit board (FPCB) may be connected to the pad 150 on the third region III.

Figure 2:
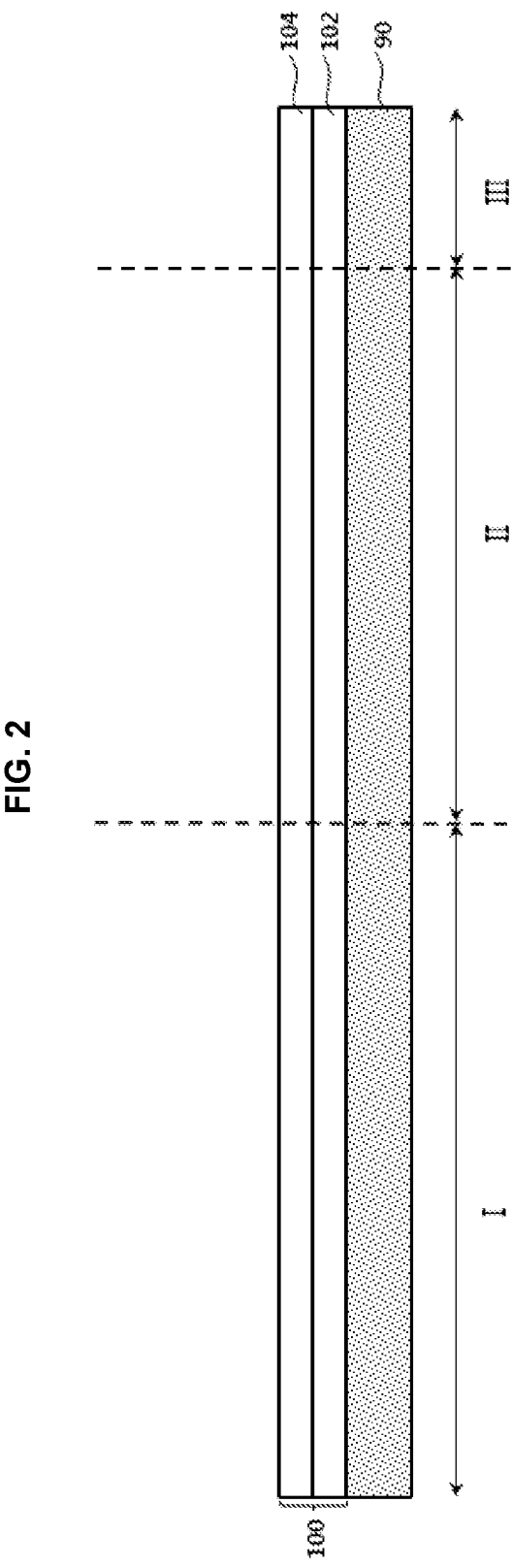
FIGS. 2 to 10 are cross-sectional views illustrating a method of manufacturing a touch sensor in accordance with exemplary embodiments.
Figure 9:
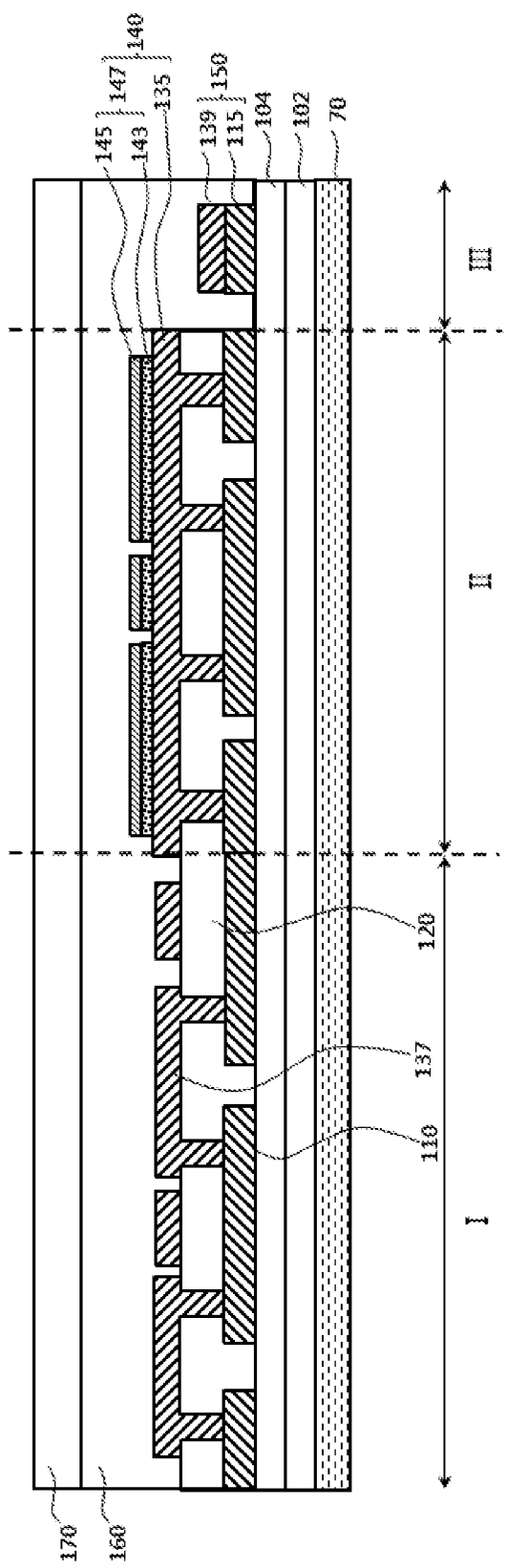

The base film 100 may serve as a supporting layer for forming conductive patterns and an insulation structure of the touch sensor as described below. In some embodiments, the base film 100 may, e.g., include a separation layer 102 and a protective layer 104 as illustrated in FIG. 2. In some embodiments, the base film 100 may include a substrate layer 70 as illustrated in FIG. 9.

Bridge patterns 110 may be formed on the base film 100. In exemplary embodiments, the bridge patterns 110 may include a metal or an alloy having a resistance less than that of, e.g., a transparent metal oxide to improve a signal transfer efficiency and a sensitivity. For example, the bridge patterns 110 may include silver (Ag), palladium (Pd), gold (Au), aluminum (Al), copper (Cu), platinum (Pt), cobalt (Co), tungsten (W), zinc (Zn), iron (Fe), nickel (Ni), titanium (Ti), tantalum (Ta), chromium (Cr) or an alloy thereof. Some of the sensing electrode patterns 137 and 140 neighboring each other may be electrically connected to each other by the bridge pattern 110.

The bridge patterns 110 may be disposed on portions of the first region I and the second region II of the base film 100. A first conductive pattern 115 may be disposed on a portion of the third region III of the base film 100. The first conductive pattern 115 may include a material substantially the same as that of the bridge pattern 110. In exemplary embodiments, the first conductive pattern 115 may include the metal or the alloy as described above. The first conductive pattern 115 may be disposed on substantially the same level as that of the bridge patterns 110.

An insulation layer 120 partially covering the bridge pattern 110 may be formed on the base film 100. A contact hole 125 partially exposing a top surface of the bridge pattern 110 may be formed in the insulation layer 120.

In some embodiments, the insulation layer 120 may be formed on the first region I and the second region II of the base film 100. In an embodiment, the insulation layer 120 may not extend to the third region III.

The insulation layer 120 may include an inorganic insulation material such as silicon oxide, or a transparent organic material such as an acryl-based resin.

The sensing electrode patterns 137 and 140 may be disposed on the insulation layer 120. The first sensing electrode pattern 137 may be disposed on the first region I, and the second sensing electrode pattern 140 may be disposed on the second region II. Some of the sensing electrode patterns 137 and 140 may be electrically connected to the bridge pattern 110 via the contact hole 125 formed in the insulation layer 120.

In exemplary embodiments, the first sensing electrode pattern 137 may have a resistance (e.g., a sheet resistance or a channel resistance in the same width) greater than that of the second sensing electrode pattern 140, and may have a light transmittance greater than that of the second sensing electrode pattern 140.

The first sensing electrode pattern 137 may include a conductive transparent metal oxide. For example, the first sensing electrode pattern 137 may include a transparent metal oxide such as indium tin oxide (ITO), indium zinc oxide (IZO), aluminum zinc oxide (AZO), gallium zinc oxide (GZO), indium tin zinc oxide (ITZO), zinc tin oxide (ZTO), indium gallium oxide (IGO), tin oxide ($SnO_2$), zinc oxide (ZnO), etc.

In an embodiment, the first sensing electrode pattern 137 may include ITO from an aspect of improving transmittance. The first sensing electrode pattern 137 may be formed as a single layer of the transparent metal oxide. For example, the first sensing electrode pattern 137 may be a single layer consisting of ITO.

The second sensing electrode pattern 140 may have a multi-layered structure including a conductive transparent metal oxide layer and a metal layer. In some embodiments, the second sensing electrode pattern 140 may include a triple-layered structure including a first metal oxide patterns 135, a metal pattern 143 and a second transparent metal oxide pattern 145 sequentially stacked from a top surface of the insulation layer 120. In an embodiment, the second sensing electrode pattern 140 may include a double-layered structure including the first transparent metal oxide pattern 135 and the metal pattern 143.

The first transparent metal oxide pattern 135 may include a transparent metal oxide substantially the same as that of the first sensing electrode pattern 137 formed on the first region I. In some embodiments, the first transparent metal oxide pattern 135 may include ITO.

The metal pattern 143 may include Ag, Pd, Au, Al, Cu, Pt, Co, W, Zn, Fe, Ni, Ti, Ta, Cr, or an alloy thereof. For example, the metal pattern 143 may include an alloy such as Ag—Pd—Cu for implementing a low resistance and a flexible property.

The second transparent metal oxide pattern 145 may include a material different from that of the first transparent metal oxide pattern 135 for implementing a low resistance. For example, the second transparent metal oxide pattern 145 may include IZO.

In exemplary embodiments, a low resistance pattern 147 having a resistance less than that of the first sensing electrode pattern 137 may be defined by the metal pattern 143 and the second transparent metal oxide pattern 145. The low resistance pattern 147 may be disposed on the first transparent metal oxide pattern 135.

In some embodiments, the low resistance pattern 147 may have a single-layered structure of the metal pattern 143. In some embodiments, the low resistance pattern 147 may further include the second transparent metal oxide pattern 145 so that an increase of reflectivity or a reduction of transmittance caused by the metal pattern 143 may be buffered or prevented.

The first sensing electrode pattern 137 may include a first pattern 137*a* and a second pattern 137*b*, and the second sensing electrode pattern 140 may include a first pattern 140*a* and a second pattern 140*b*. In exemplary embodiments, the first patterns 137*a* and 140*a* may each have a separated island shape. The second patterns 137*b* and 140*b* may include unit patterns connected to each other by a connecting portion to extend in a linear shape.

The first patterns 137*a* and 140*a* neighboring each other with respect to the second pattern 137*b* and 140*b* may be electrically connected to the bridge pattern 110. Accordingly, the first patterns 137*a* and 140*a* and the second patterns 137*b* and 140*b* may be arranged in directions crossing each other while being insulated from each other. The bridge pattern 110 may include a low resistance metal as mentioned above, and thus signal transfer efficiency and sensitivity through the first patterns 137*a* and 140*a* may be improved.

A second conductive pattern 139 may be disposed on the first conductive pattern 115 on the third region III. In exemplary embodiments, the second conductive pattern 139 may include a transparent metal oxide substantially the same as that of the first sensing electrode pattern 137 and the first transparent metal oxide pattern 135. In some embodiments, the second conductive pattern 139 may include ITO.

A stack structure of the first conductive pattern 115 and the second conductive pattern 139 on the third region III may be provided as the pad 150. The second conductive pattern 139 including the transparent metal oxide may cover the first conductive pattern 115 including the metal so that an oxidation of the pad 150 by an exposure to an external environment may be prevented, and a transmittance on the third region III may be also enhanced.

A passivation layer 160 may be formed on the insulation layer 120 to cover the first and second sensing electrode patterns 137 and 140. The passivation layer 160 may include an inorganic oxide such as silicon oxide, or an organic insulation material.

The passivation layer 160 may be formed selectively on the first region I and the second region II. In some embodiments, the passivation layer 160 may partially extend to the third region III, and may not cover a top surface of the pad 150.

According to exemplary embodiments of the present invention as described above, the sensing electrode pattern on the first region I that may be required to have a high transmittance property may have a single-layered structure of the transparent metal oxide, and the sensing electrode pattern on the second region II that may be required to have a high sensitivity property may have a multi-layered structure including the transparent metal oxide pattern and the metal pattern. Thus, a sheet resistance or a channel resistance in the same width of the sensing electrode pattern may be reduced while maintaining a desired transmittance on the second region II. A transmittance of the sensing electrode pattern may be improved while maintaining a desired channel resistance on the first region I.

For example, the second sensing electrode pattern 140 on the second region II may have a larger thickness and a smaller channel width (e.g., a pattern width) than those of the first electrode pattern 137 on the first region I. For example, a width of a unit pattern included in the second sensing electrode pattern 140 may be in a range from about 30 μm to about 150 μm, and a width of a unit pattern included in the first sensing electrode pattern 137 may be in a range from about 1,000 μm to about 5,000 μm.

The channel resistance of the second sensing electrode pattern 140 may be in a range from about 2,000Ω to about 10,000Ω, and the channel resistance of the first sensing electrode pattern 137 may be in a range from about 10,000Ω to about 25,000Ω.

According to embodiments illustrated in FIG. 1, the touch sensor may have a bottom-bridge structure in which the bridge pattern 110 including the metal may be disposed under the sensing electrode patterns 137 and 140. The bridge pattern 110 including the low resistance metal may be disposed to be farther away from a visible side (e.g., a top surface of the passivation layer 160) so that a light reflectance may be reduced, and a channel resistance may be also reduced.

FIGS. 2 to 10 are cross-sectional views illustrating a method of manufacturing a touch sensor in accordance with exemplary embodiments.

Referring to FIG. 2, a separation layer 102 and a protective layer 104 may be formed sequentially on a carrier substrate 90.

For example, a glass substrate or a plastic substrate may be used as the carrier substrate 90. The separation layer 102 may serve as a functional layer for facilitating a detachment process from the substrate 90 that may be performed afterward. For example, the separation layer 102 may be formed of polyimide, poly vinyl alcohol, polyamic acid, polyamide, polyethylene, polystyrene, polynorbornene, phenylmaleimide copolymer, polyazobenzene, polyphenylene phthalamide, polyester, polymethyl methacrylate, polyarylate, a cinnamate-based polymer, a coumarin-based polymer, phthalimidine, a chalcone-based polymer, an aromatic acetylene-based polymer, or the like. These may be used alone or in a mixture thereof.

A composition including the above-mentioned polymer may be coated by, e.g., a slit coating, a knife coating, a spin coating, a casting, a micro gravure coating, a gravure coating, a bar coating, a roll coating, a wire bar coating, a dip coating, a spray coating, a screen printing, a gravure printing, a flexo printing, an offset printing, an inkjet coating, a dispenser printing, a nozzle coating, a capillary tube coating, etc., on the carrier substrate 90, and may be cured to form the separation layer 102.

The protective layer 104 may provide a protection of electrode patterns in the touch sensor and a refractive index matching with the electrode patterns. For example, the protective layer 104 may be formed of an inorganic insulation material such as silicon oxide, silicon nitride, silicon oxynitride, or a polymer-based organic insulation material.

The separation layer 102 and the protective layer 104 may serve as a base film for subsequent processes. The base film 100 may be divided into a first region I, a second region II and a third region III according to sectors or regions of the touch sensor. The first region I, the second region II and the third region III may correspond to a high transmittance region, a high sensitivity region and a pad region, respectively.

Figure 3:
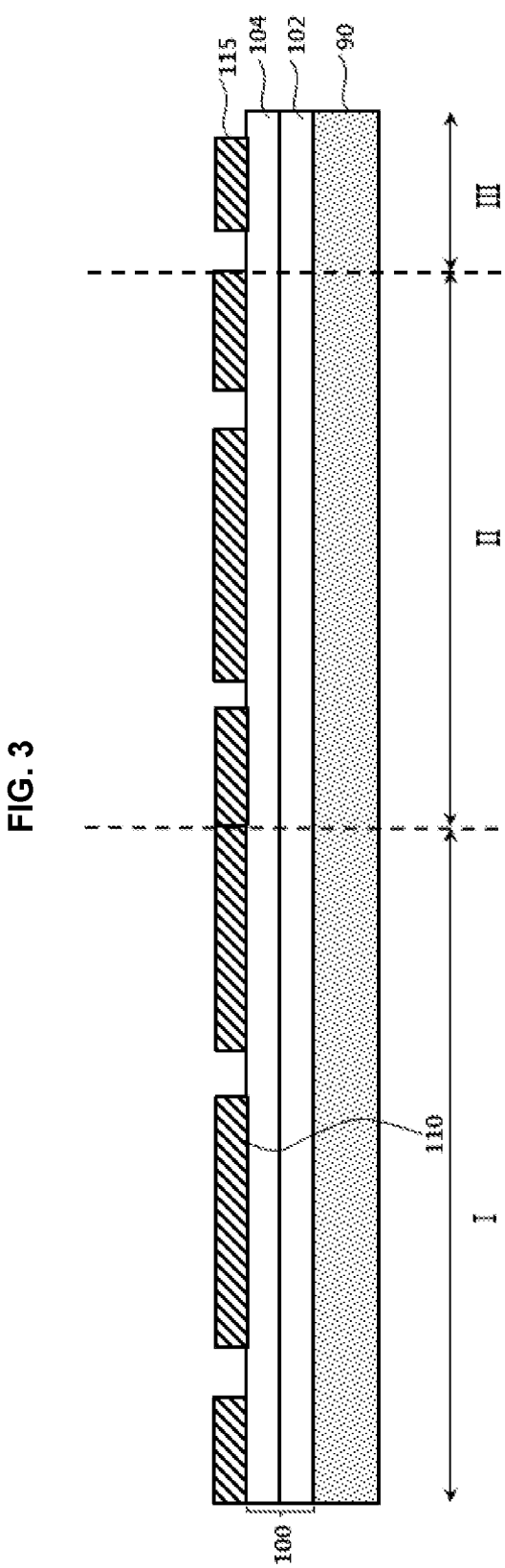

Referring to FIG. 3, bridge patterns 110 and a first conductive pattern 115 may be formed on the base film 100.

In exemplary embodiments, a conductive layer including a metal or an alloy may be formed on the base film 100, and may be patterned by a photo-lithography process using a first photo-mask to form the bridge patterns 110 and the first conductive pattern 115.

The bridge patterns 110 may be formed on the first region I and the second region II, and the first conductive pattern 115 may be formed on the third region III.

Figure 4:
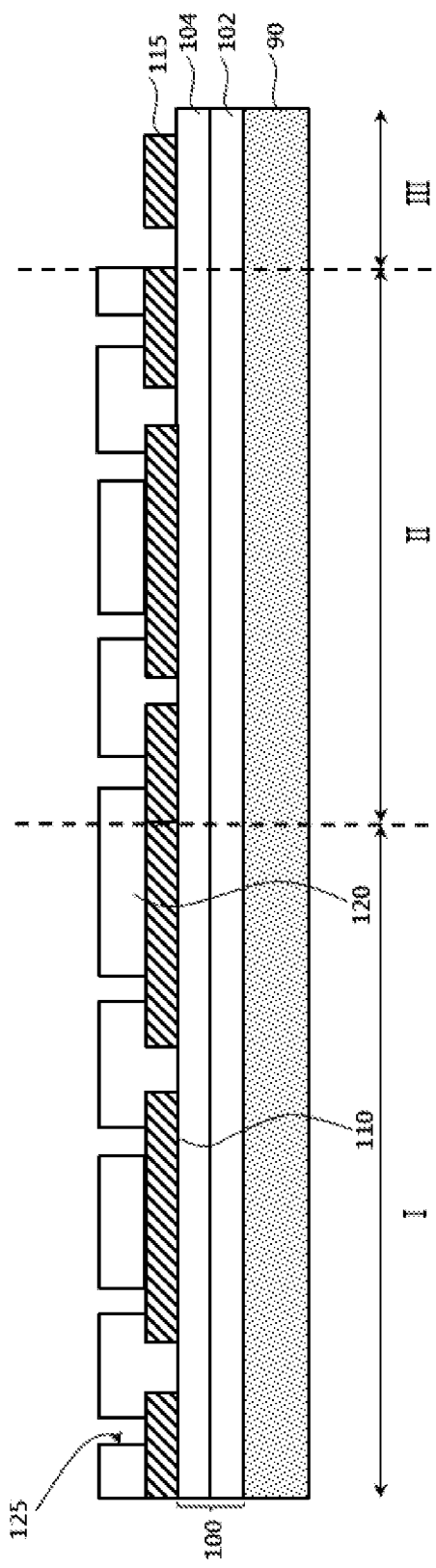

Referring to FIG. 4, an insulation layer 120 partially covering the bridge patterns 110 may be formed on the base film 100.

In exemplary embodiments, a photosensitive organic composition including, e.g., an acryl-based resin may be coated by a spin coating process, and an exposure process using a second photo-mask and a developing process may be performed to form the insulation layer 120.

Contact holes 125 partially exposing a top surface of the bridge pattern 110 may be formed in the insulation layer 120. In some embodiments, the insulation layer 120 may be substantially removed from the third region III so that the first conductive pattern 115 may be exposed.

Figure 5:
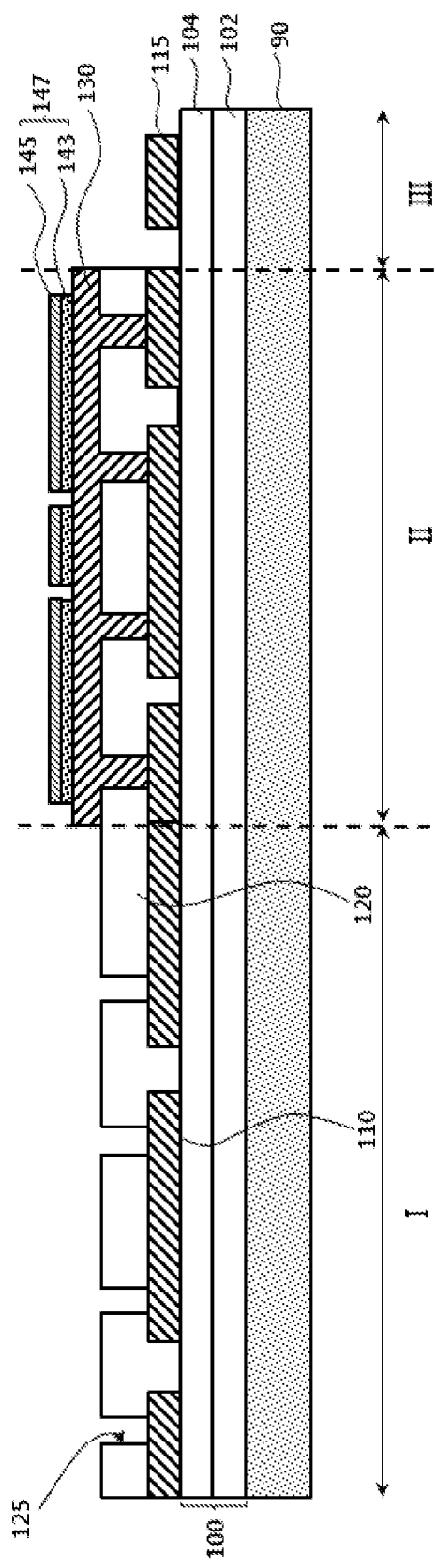

Referring to FIG. 5, a first transparent metal oxide layer 130 may be formed on a portion of the insulation layer 120 on the second region II, and a low resistance pattern 147 may be formed on the first transparent metal oxide layer 130. The low resistance pattern 147 may be selectively formed on the second region II, and a plurality of the low resistance patterns 147 may be formed.

In an embodiment, as illustrated in FIG. 5, the first transparent metal oxide layer 130 may be selectively formed on the second region II. The first transparent metal oxide layer 130 may fill the contact hole 125 to be in contact with the bridge pattern 110.

A metal layer and a second transparent metal oxide layer may be formed, and then may be patterned by a photo-lithography process using a third photo-mask to form the low resistance pattern 147. Accordingly, the low resistance pattern 147 may include a metal pattern 143 and a second transparent metal oxide pattern 145 sequentially formed on the first transparent metal oxide layer 130.

In an embodiment, the first transparent metal oxide layer 130 and the second transparent metal oxide layer may be formed on ITO and IZO, respectively. The first transparent metal oxide layer 130, the metal layer and the second transparent metal oxide layer may be formed by a deposition process such as a chemical vapor deposition (CVD) process, a sputtering process, a physical vapor deposition (PVD) process, etc.

Figure 6:
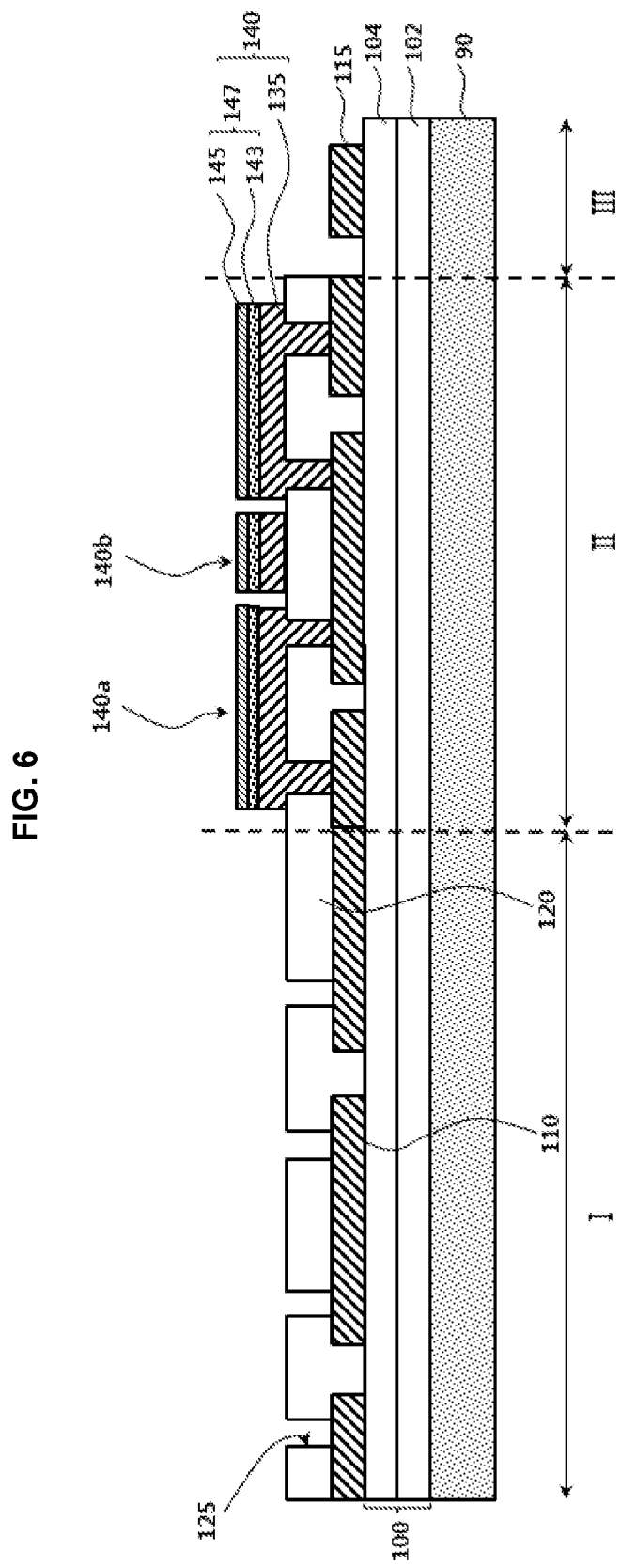

Referring to FIG. 6, the first transparent metal oxide layer 130 may be partially etched using the low resistance pattern 147 as an etching mask to form a first transparent metal oxide pattern 135. The etching process may be performed using an etching gas or an etchant solution having an etching selectivity for ITO.

After the etching process, a second sensing electrode pattern 140 including the first transparent metal oxide pattern 135 and the low resistance pattern 147 sequentially stacked on the insulation layer 120 may be formed on the second region II.

The second sensing electrode pattern 140 may include a first pattern 140a and a second pattern 140b. The first sensing pattern 140a may have a separated island shape, and the neighboring first patterns 140a with respect to the second pattern 140b may be electrically connected to each other via the bridge pattern 110.

Figure 7:
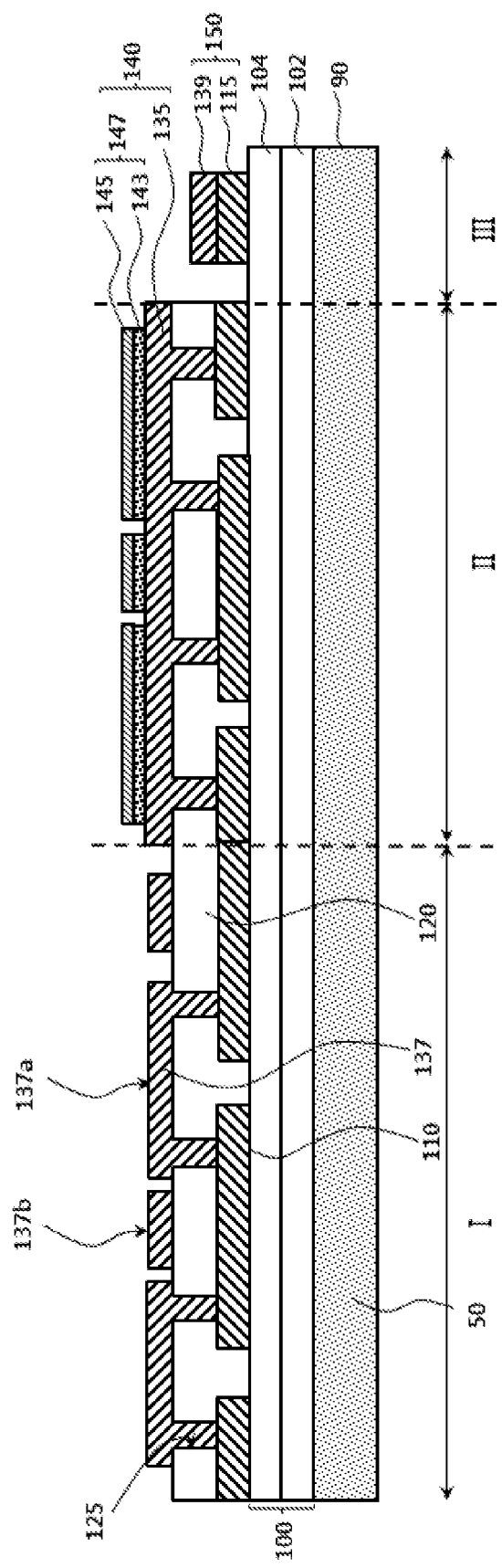

Referring to FIG. 7, a first sensing electrode pattern 137 and a second conductive pattern 139 may be formed on the first region I and the third region III, respectively.

In exemplary embodiments, a third transparent metal oxide layer may be formed selectively on the first region I and the third region III, respectively, and may be patterned by a photo-lithography process using a fourth photo-mask to form the first sensing electrode pattern 137 and the second conductive pattern 139

The third transparent metal oxide layer may be formed on the insulation layer 120 of the first region I to fill the contact holes 125. The third transparent metal oxide layer may be formed of a material the same as that of the first transparent metal oxide layer 130. In an embodiment, the third transparent metal oxide layer may be formed of ITO.

The first sensing electrode pattern 137 may include a first pattern 137a and a second pattern 137b. The first sensing pattern 137a may have a separated island shape, and the neighboring first patterns 137a with respect to the second pattern 137b may be electrically connected to each other via the bridge pattern 110.

The second conductive pattern 139 may be formed on the first conductive pattern 115. Accordingly, a pad 150 including a metal layer and a transparent metal oxide layer may be formed on the third region III.

Figure 8:
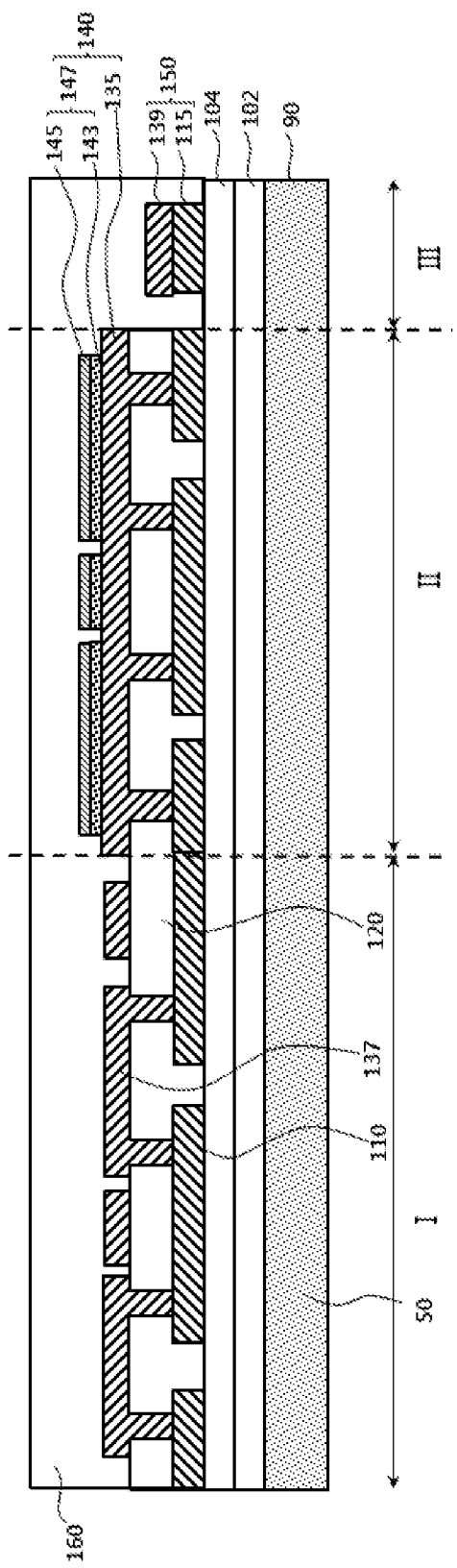

Referring to FIG. 8, a passivation layer 160 covering the first sensing electrode pattern 137, the second sensing electrode pattern 140 and the pad 150 may be formed on the insulation layer 120 and the base film 100. The passivation layer 160 may be formed of an organic insulation material or an inorganic insulation material by the above-mentioned coating process or deposition process.

In some embodiments, the passivation layer 130 may be commonly formed continuously on the first to third regions I, II and III.

Referring to FIG. 9, a protective film 170 may be attached on the passivation layer 160. For example, the protective film 170 may include a transparent resin film formed of cellulose ester (e.g., cellulose triacetate, cellulose propionate, cellulose butyrate, cellulose acetate, nitro cellulose, etc.), polyimide, polycarbonate, polyester, polyethylene terephthalate, polystyrene, polyolefin, polysulfone, polyether sulfone, polyarylate, polyether-imide, polymethyl methacrylate, polyether ketone, polyvinyl alcohol, polyvinyl chloride, etc. These may be used alone or in a combination thereof.

For example, a first adhesive layer may be formed on the passivation layer 160, and the protective film 170 may be attached through the first adhesive layer.

Subsequently, the carrier substrate 90 may be separated or detached from the separation layer 102, and then a substrate layer 70 may be attached to a surface of the separation layer 102 from which the carrier substrate 90 is separated. For example, a second adhesive layer may be formed on a surface of the substrate layer 70, and then the substrate layer 70 and the separation layer 102 may be combined via the second adhesive layer. The substrate layer 70 may include a flexible resin film such as a polyimide film, or an optical functional layer such as a polarizing film.

Figure 10:
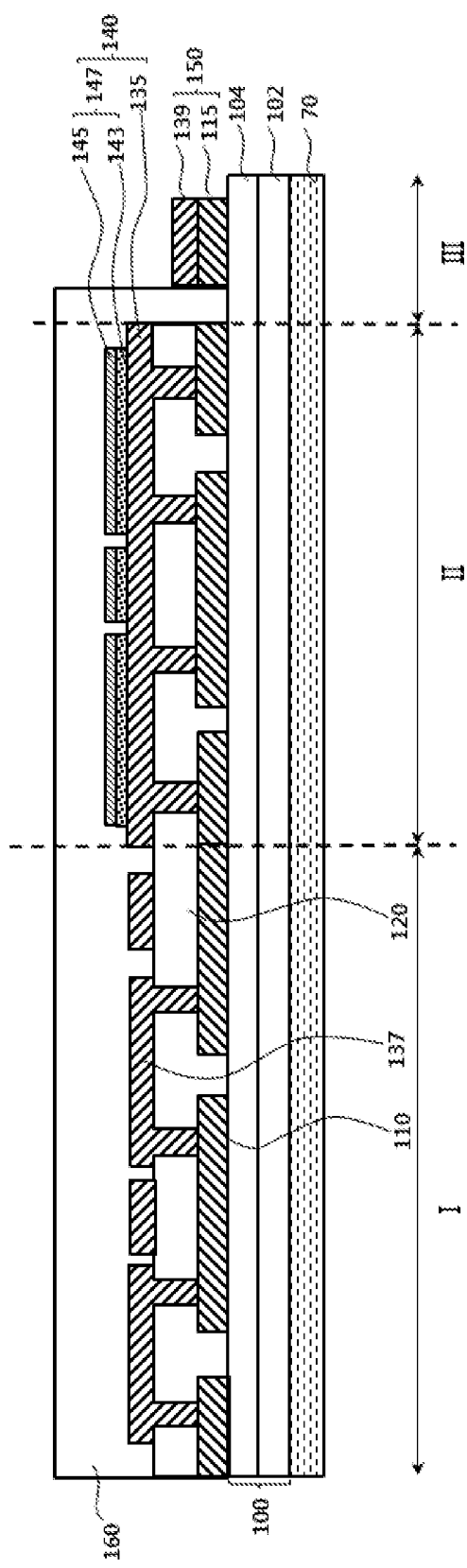

Referring to FIG. 10, a thermal curing process may be performed so that a peel strength of the first adhesive layer may be reduced, and then the protective film 170 may be removed. Subsequently, a portion of the passivation layer 160 formed on the third region III may be removed to expose the pad 150.

Functional layers of an image display device such as a polarizing film, a retardation film, etc., may be further formed on the passivation layer 160 or the substrate layer 70. Additionally, a flexible printed circuit board (FPCB) may be connected to the pad 150.

As described above, the sensing electrode patterns 137 and 140 having different stack constructions may be formed on the first region I and the second region II in an integrated fabricating process of the touch sensor. In exemplary embodiments, the low resistance pattern 147 may be included in the second sensing electrode pattern 140, and the low resistance pattern 140 may also serve as a mask for forming the second sensing electrode pattern 140. Accordingly, a sensing electrode structure satisfying each regional property may be realized.

Figure 11:
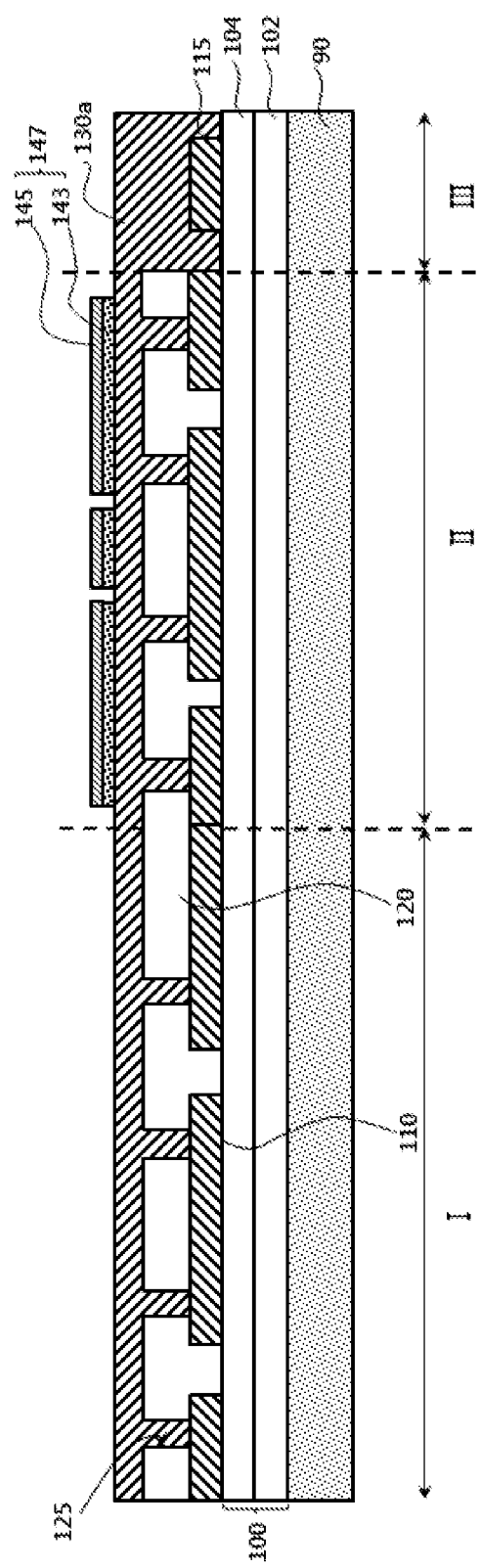
FIGS. 11 and 12 are cross-sectional views illustrating a method of manufacturing a touch sensor in accordance with some exemplary embodiments.
Figure 12:
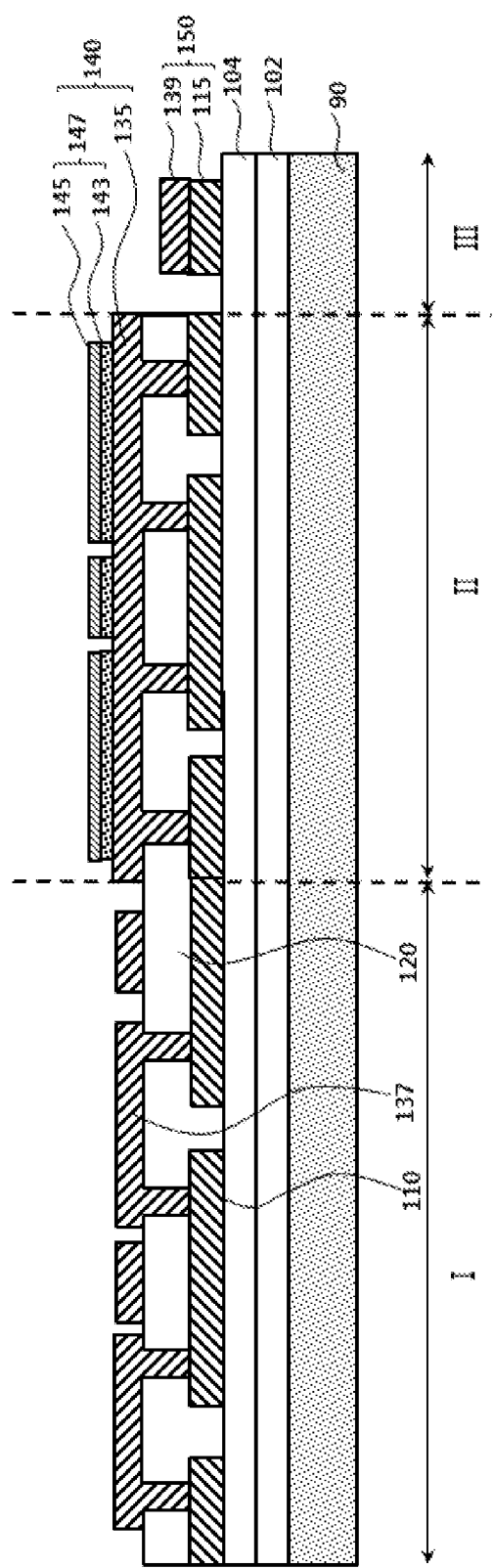

FIGS. 11 and 12 are cross-sectional views illustrating a method of manufacturing a touch sensor in accordance with some exemplary embodiments. Detailed descriptions on processes substantially the same as or similar to those described with reference to FIGS. 2 to 10 are omitted herein.

Referring to FIG. 11, processes substantially the same as or similar to those described with reference to FIGS. 2 to 4 may be performed. Subsequently, a first transparent metal oxide layer 130a may be formed, and a low resistance pattern 147 including a metal pattern 143 and a second transparent metal oxide pattern 145 may be formed on a portion of the first transparent metal oxide layer 130a formed on the second region II.

In some embodiments, the first transparent metal oxide layer 130a may be commonly and continuously formed on the first to third regions I, II and III. The first transparent metal oxide layer 130a may cover the insulation layer 120 on the first region I and the second region II to fill the contact holes 125. Further, the first transparent metal oxide layer 130a may cover the first conductive pattern 115 on the third region III.

Referring to FIG. 12, the first transparent metal oxide layer 130a may be patterned by a photo-lithography process to form a first sensing electrode pattern 137, a second sensing electrode pattern 140 and a second conductive pattern 139.

In some embodiments, the low resistance pattern 147 may substantially serve as an etching mask on the second region II to form the second sensing electrode pattern 140. A photo-mask (e.g., a fourth photo-mask) may be used on the first region I and the third region III to form the first sensing electrode pattern 137 and the second conductive pattern 139. The second conductive pattern 139 may be formed on the first conductive pattern 115 to obtain a pad 150.

Subsequently, processes substantially the same as or similar to those described with reference to FIGS. 8 to 10 may be performed to achieve a touch sensor.

According to embodiments as described above, the first sensing electrode pattern 137, the second sensing electrode pattern 140 and the second conductive pattern 139 may be formed from the first transparent metal oxide layer 130a simultaneously by a single etching process. Thus, a process efficiency and productivity may be improved.

Figure 13:
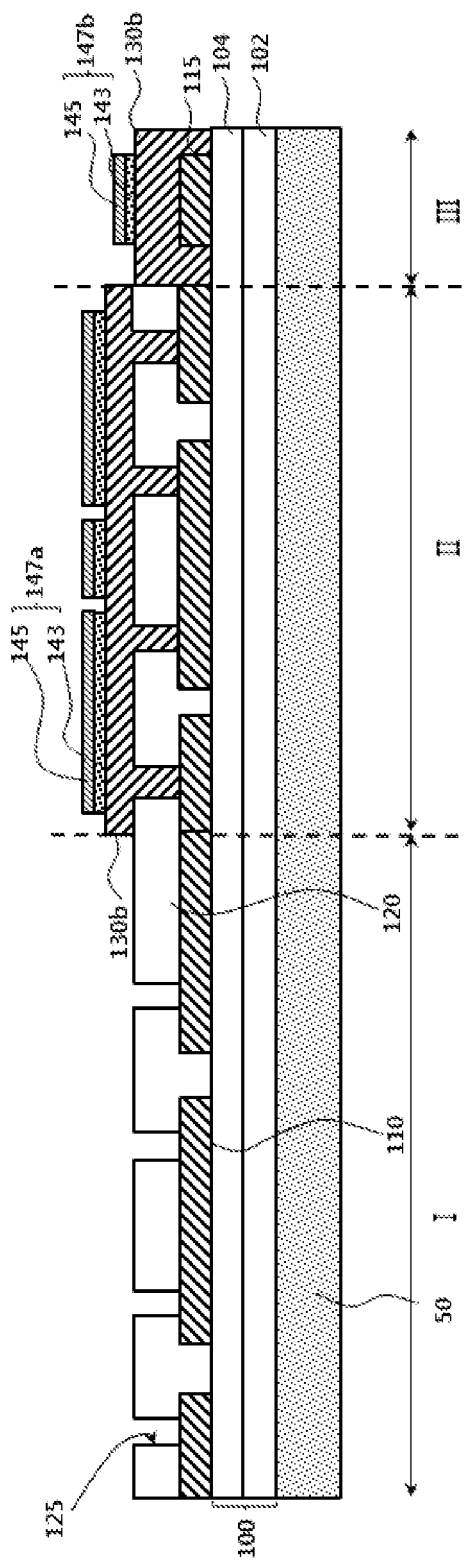
FIGS. 13 and 14 are cross-sectional views illustrating a method of manufacturing a touch sensor in accordance with some exemplary embodiments.
Figure 14:
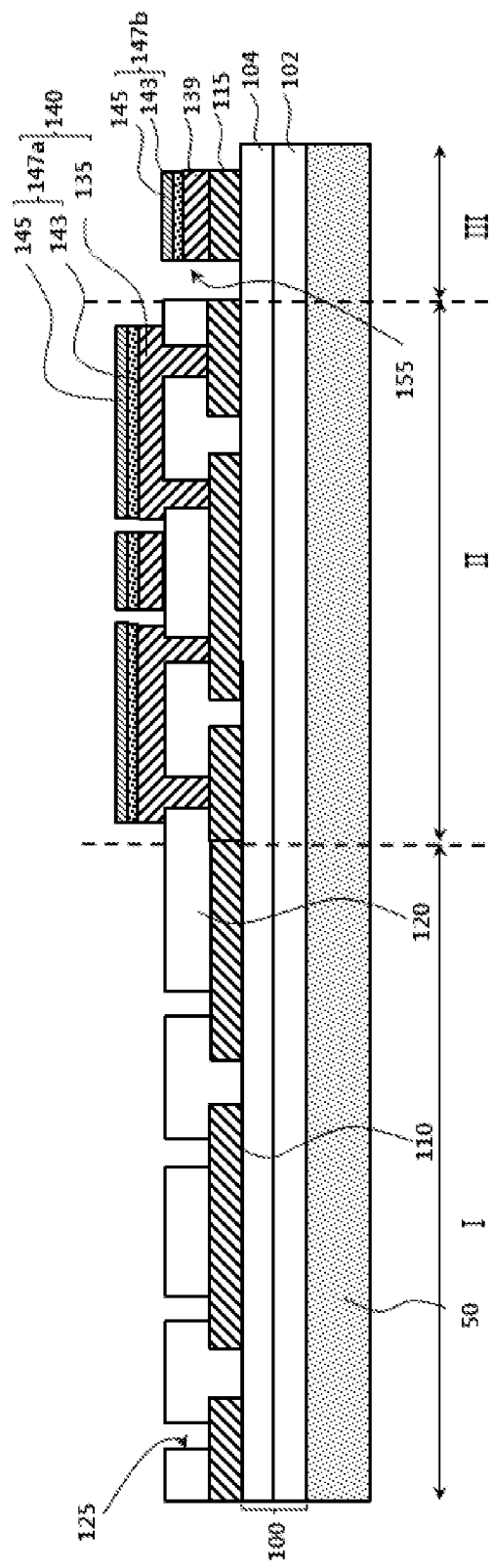

FIGS. 13 and 14 are cross-sectional views illustrating a method of manufacturing a touch sensor in accordance with some exemplary embodiments.

Referring to FIG. 13, processes substantially the same as or similar to those described with reference to FIGS. 2 to 4 may be performed. Afterwards, a first transparent metal oxide layer 130b may be formed, and a first low resistance pattern 147a and a second low resistance pattern 147b may be formed on portions of the first transparent metal oxide layer 130b of the second region II and the third region III, respectively.

The first and second low resistance patterns 147a and 147b may include a stack structure of a metal pattern 143 and a second transparent metal oxide pattern 145. In some embodiments, the first transparent metal oxide layer 130b may be formed selectively on the second region II and the third region III, and may cover a portion of the insulation layer 120 of the second region II and the first conductive pattern 115. As illustrated in FIG. 13, the transparent metal oxide layer 130b may have a relatively low top surface on the third region III due to a stepped portion between the second region II and the third region III.

Referring to FIG. 14, the first transparent metal oxide layer 130b may be patterned by a photo-lithography process using the first and second low resistance patterns 147a and 147b as an etching mask.

Accordingly, a first transparent metal oxide pattern 135 and a second conductive pattern 139 may be formed from the first transparent metal oxide layer 130b on the second region II and the third region III, respectively. A second sensing electrode pattern 140 including the first transparent metal oxide pattern 135 and the first low resistance pattern 147a may be formed on the second region II, and a pad 155 including the first conductive pattern 115, the second conductive pattern 139 and the second low resistance pattern 147b may be formed on the third region III.

Subsequently, as described with reference to FIG. 7, a first sensing electrode pattern may be formed on the first region I, and processes substantially the same as or similar to those described with reference to FIGS. 8 to 10 may be performed to obtain a touch sensor.

According to embodiments as described above, the pad 155 may also include the low resistance pattern 147b so that a signal resistance through the pad 155 may be further reduced. Thus, a sensitivity and an operation speed of the touch sensor may be further improved.

Figure 15:
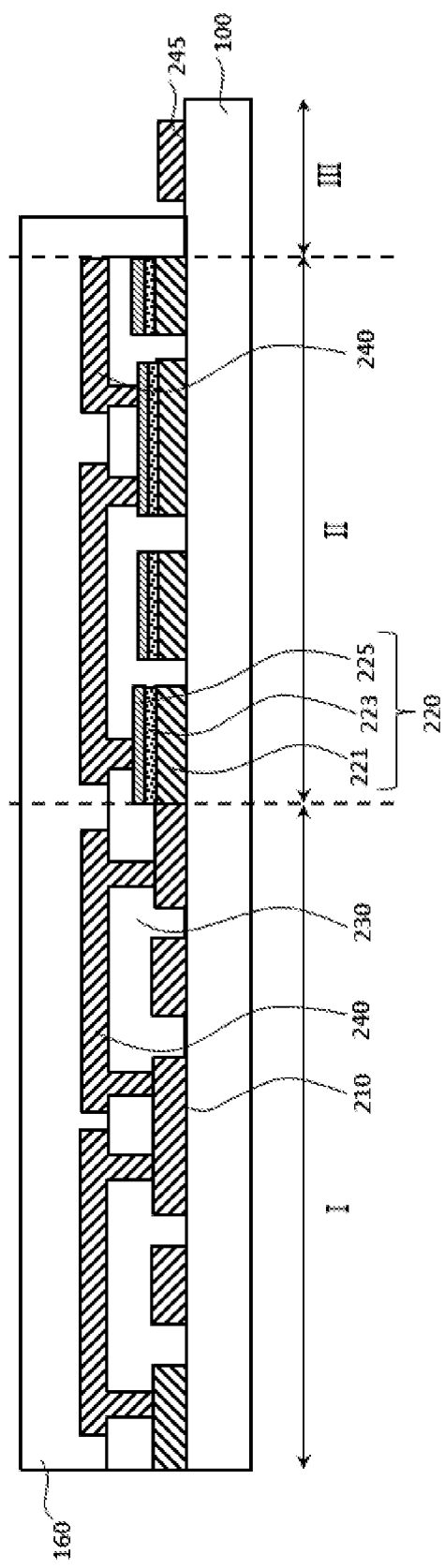
FIG. 15 is a cross-sectional view illustrating a touch sensor in accordance with some exemplary embodiments.

FIG. 15 is a cross-sectional view illustrating a touch sensor in accordance with some exemplary embodiments. Detailed descriptions on elements substantially the same as or similar to those described with reference to FIG. 1 are omitted herein. Referring to FIG. 15, the touch sensor may have a top-bridge structure in which a bridge pattern 240 is disposed on sensing electrode patterns 210 and 220.

A first sensing electrode pattern 210 that may be disposed on the first region I may have a single-layered structure of a transparent metal oxide such as ITO. A second sensing electrode pattern 220 may include a first transparent metal oxide pattern 221, a metal pattern 223 and a second transparent metal oxide pattern 225 sequentially stacked from a top surface of a base film 100.

In some embodiments, the first transparent metal oxide pattern 221 and the second transparent metal oxide pattern 225 may include ITO and IZO, respectively. A low resistance pattern may be defined by the metal pattern 223 and the second transparent metal oxide pattern 225.

The bridge pattern 240 may include a metal, and may be formed on an insulation layer 230. Neighboring ones of the sensing electrode patterns 210 and 220 may be electrically connected to each other via the bridge pattern 240 which may be formed through a contact hole in the insulation layer 230.

A pad 245 may be disposed on a portion of a base film 100 on the third region III. The pad 245 may be formed by substantially the same photo-lithography process as that for the bridge pattern 240, and may include the metal.

Figure 16:
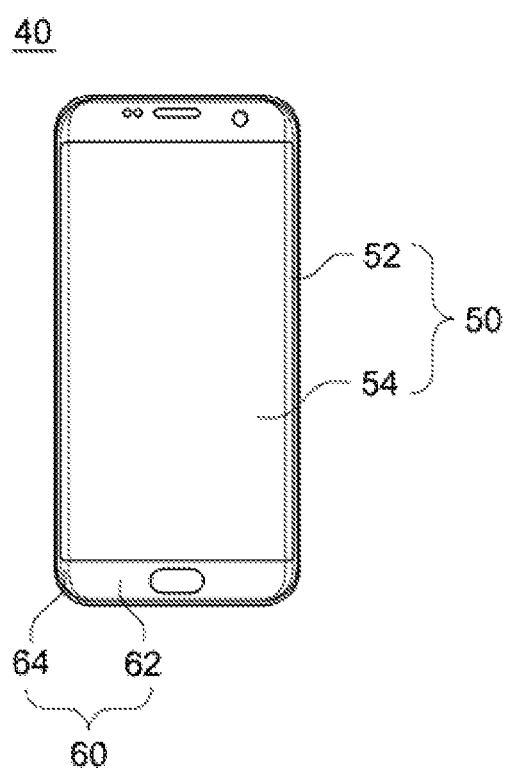
FIG. 16 is a schematic view illustrating an image display device in accordance with exemplary embodiments.

FIG. 16 is a schematic view illustrating an image display device in accordance with exemplary embodiments.

Referring to FIG. 16, an image display device 40 may include a display region 50 and a non-display region 60. An image may be displayed through the display region 50. For example, an icon for a touch input may be displayed through the display region 40. The non-display region 60 may correspond to, e.g., a bezel portion or a light-shielding portion of the image display device 40.

The display region 50 may include a first plane portion 54 and a first bent portion 52. The touch sensor as described above may be disposed under a window film exposed at an outside of the image display device 40.

In exemplary embodiments, the first region I of the touch sensor which may be a high transmittance region may be placed in the first plane portion 54. The second region II of the touch sensor which may be a high sensitivity region may be placed in the first bent portion 52.

A sensing electrode pattern of a single ITO layer may be disposed in the first plane portion 54 which may be a front image face to a user, so that a transmittance of the image display device may be improved. Further, a multi-layered sensing electrode pattern including a low resistance pattern may be disposed in the first bent portion 52 which may be a lateral portion of the image display device 40, so that a signal transfer sensitivity and reliability may be improved.

The third region III of the touch sensor may be located in, e.g., the non-display region 60. For example, the non-display region 60 may include a second plane portion 62 and a second bent portion 64.

As described above, a high transmittance sensing electrode pattern and a high sensitivity sensing electrode pattern may be arranged according to regions of the image display device so that the image display device having improved transmittance and touch sensitivity may be achieved.

The image display device may include a display panel of various display devices such as a liquid crystal display (LCD) device, a plasma display panel (PDP) device, an organic light-emitting diode (OLED) device, etc. The touch sensor according to exemplary embodiments may be disposed between the display panel and a window film. For example, the touch sensor may be applied to a touch sensor layer or a touch panel of a flexible display device so that an image display device having high transmittance, high sensitivity and high flexibility may be achieved.

What is claimed is:

1. A touch sensor, comprising:
a base film including a first region and a second region;
first sensing electrode patterns on the first region of the base film, the first sensing electrode patterns consisting of a single layer of a transparent metal oxide; and
second sensing electrode patterns on the second region of the base film, the second sensing electrode patterns including a multi-layered structure that includes a transparent metal oxide pattern and a metal pattern,
wherein the first region has greater light transmittance than the second region, and the second region has higher touching sensitivity than the first region; and
each of the first sensing electrode patterns and the second sensing electrode patterns has first patterns and second patterns that are insulated from the first patterns, and the first patterns and the second patterns are arranged in directions crossing each other.

2. The touch sensor according to claim 1, wherein the first sensing electrode patterns have a sheet resistance the second sensing electrode patterns.

3. The touch sensor according to claim 1, wherein the second sensing electrode patterns include a first transparent metal oxide pattern, the metal pattern and a second transparent metal oxide pattern which are sequentially stacked.

4. The touch sensor according to claim 3, wherein the first transparent metal oxide pattern includes indium tin oxide (ITO), and the second transparent metal oxide pattern include indium zinc oxide (IZO).

5. The touch sensor according to claim 1, wherein the first sensing electrode patterns have a single-layered structure of indium tin oxide (ITO).

6. The touch sensor according to claim 1, further comprising bridge patterns electrically connecting neighboring ones of the first sensing electrode patterns to each other, and electrically connecting neighboring ones of the sensing electrode patterns to each other.

7. The touch sensor according to claim 6, wherein the bridge patterns include a metal, and the bridge patterns are disposed between the first sensing electrode patterns and the base film and between the second sensing electrode patterns and the base film.

8. The touch sensor according to claim 7, wherein the base film further includes a third region and a pad formed on the third region of the base film.

9. The touch sensor according to claim 8, wherein the pad includes a stack structure including a first conductive pattern and a second conductive pattern formed on the first conductive pattern, wherein the first conductive pattern includes a metal, and the second conductive pattern includes a transparent metal oxide.

10. The touch sensor according to claim 9, wherein the first conductive pattern includes the same metal included in the bridge pattern, and the second conductive pattern includes the same transparent metal oxide included in the first sensing electrode patterns.

11. The touch sensor according to claim 8, further comprising a passivation layer formed on the first region and the second region to cover the first sensing electrode pattern and the second sensing electrode pattern.

12. The touch sensor according to claim 11, wherein the passivation layer partially covers a portion of the base film on the third region such that the pad is exposed.

13. An image display device, comprising:
a window film including a plane portion and a bent portion; and
the touch sensor of claim 1 disposed under the window film,
wherein a portion of the touch sensor of the first region is located in the plane portion and a portion of the touch sensor of the second region is located in the bent portion.

14. A method of manufacturing a touch sensor, comprising:
preparing a base film including a first region and a second region;
forming a first transparent metal oxide layer on the base film;
forming a low resistance pattern on a portion of the first transparent metal oxide layer on the second region, the low resistance pattern having a resistance less than that of the first transparent metal oxide layer;
etching the first transparent metal oxide layer using the low resistance pattern as a mask to form a second sensing electrode pattern including the low resistance pattern on the second region; and
forming a first sensing electrode pattern consisting of a transparent metal oxide on a portion of the base film of the first region.

15. The method according to claim 14, wherein preparing the base film includes:
forming a separation layer on a carrier substrate; and
forming a protective layer on the separation layer.

16. The method according to claim 15, further comprising:
forming a passivation layer covering the first sensing electrode pattern and the second sensing electrode pattern; and
detaching the carrier substrate from the separation layer.

17. The method according to claim 14, wherein the base film further includes a third region,
wherein the method further comprises forming a pad on a portion of the base film of the third region.

18. The method according to claim 17, further comprising forming a second transparent metal oxide layer after forming the second sensing electrode pattern,
wherein the first sensing electrode pattern and the pad are formed simultaneously by etching the second transparent metal oxide layer.

19. The method according to claim 17, wherein the first sensing electrode pattern and the pad are formed simultaneously by etching the first transparent metal oxide layer.

20. The method according to claim 14, further comprising before forming the first transparent metal oxide layer:
forming bridge patterns on the base film by etching a metal layer; and
forming an insulation layer that includes contact holes partially exposing the bridge patterns,
wherein the first transparent metal oxide layer is formed on the insulation layer to at least partially fill the contact holes.

* * * * *